US012675652B2

(12) United States Patent
Sharma

(10) Patent No.: US 12,675,652 B2
(45) Date of Patent: Jul. 7, 2026

(54) IN-CONTEXT IMAGE TRANSLATION SYSTEM

(71) Applicant: Microsoft Technology Licensing, LLC, Redmond, WA (US)

(72) Inventor: Mrinal Kumar Sharma, Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 18/632,139

(22) Filed: Apr. 10, 2024

(65) Prior Publication Data

US 2025/0322179 A1     Oct. 16, 2025

(51) Int. Cl.
*G06F 40/58*      (2020.01)
*G06V 30/18*      (2022.01)
(52) U.S. Cl.
CPC .............. *G06F 40/58* (2020.01); *G06V 30/18* (2022.01)
(58) Field of Classification Search
USPC .......................................... 382/229; 704/1–4
See application file for complete search history.

(56) References Cited

U.S. PATENT DOCUMENTS

| | | | | |
|---|---|---|---|---|
| 8,725,490 | B2 * | 5/2014 | Athsani ................... | G06F 40/58 |
| | | | | 703/3 |
| 9,514,377 | B2 | 12/2016 | Cuthbert | |
| 9,558,158 | B2 | 1/2017 | Gusakov et al. | |
| 9,779,085 | B2 * | 10/2017 | Wick ...................... | G06F 40/44 |
| 10,943,158 | B2 * | 3/2021 | Englund .............. | G06V 30/142 |
| 10,984,279 | B2 | 4/2021 | Ramachandra Iyer | |
| 11,120,268 | B2 * | 9/2021 | Gupta .............. | G06V 30/19173 |
| 12,394,235 | B2 * | 8/2025 | Nasir .............. | G06V 30/19147 |
| 2003/0125927 | A1 * | 7/2003 | Seme .................... | H04L 51/063 |
| | | | | 704/3 |
| 2003/0200078 | A1 * | 10/2003 | Luo ......................... | G06F 40/58 |
| | | | | 704/2 |

(Continued)

FOREIGN PATENT DOCUMENTS

| | | | | | |
|---|---|---|---|---|---|
| EP | | 2434433 | A2 * | 3/2012 | ............. G06V 10/10 |
| IN | 201721009713 | A | | 9/2018 | |

OTHER PUBLICATIONS

Chen, et al., "Diffute: Universal text editing diffusion model.", In 37th Conference on Neural Information Processing Systems, Oct. 18, 2023, 13 Pages.

*Primary Examiner* — Ishrat I Sherali
(74) *Attorney, Agent, or Firm* — NovoTechIP International PLLC

(57)      ABSTRACT

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

20 Claims, 10 Drawing Sheets

(56)                    References Cited

U.S. PATENT DOCUMENTS

2003/0202683 A1*  10/2003  Ma ................... G08G 1/096725
                                                    382/104
2004/0210444 A1*  10/2004  Arenburg ............. G06F 40/263
                                                    704/277
2018/0341631 A1*  11/2018  Verma .................... G06F 40/30
2024/0046048 A1*   2/2024  Packowski ............. G06F 40/51
2024/0320952 A1*   9/2024  Petitpont ............. G06V 10/761

* cited by examiner

RESTAURANT MENU

Item Description, main item,
side items, options, etc.

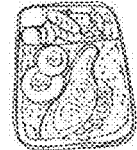

Item Description, main item,
side items, options, etc.

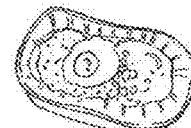

Item Description, main item,
side items, options, etc.

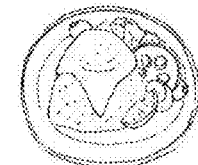

Item Description, main item,
side items, options, etc.

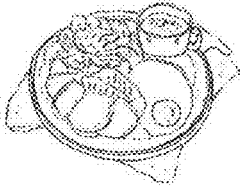

FIG. 1A

Translated Text

Elemento Descripción, elemento principal, elementos
laterales, opciones, etc. Elemento Descripción, elemento
principal, elementos laterales, opciones, etc.Elemento
Descripción, elemento principal, elementos laterales,
opciones, etc.Elemento Descripción, elemento principal,
elementos laterales, opciones, etc.

FIG. 1B
Prior Art

Menú del restaurante
Elemento Descripción, elemento
principal, elementos laterales,
opciones, etc.
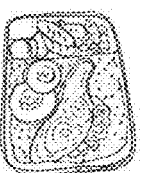
Elemento Descripción, elemento
principal, elementos laterales,
opciones, etc.
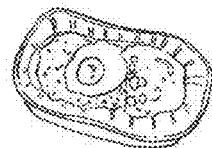
Elemento Descripción, elemento
principal, elementos laterales,
opciones, etc.
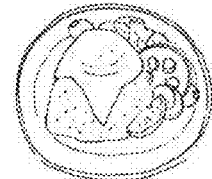
Elemento Descripción, elemento
principal, elementos laterales,
opciones, etc.
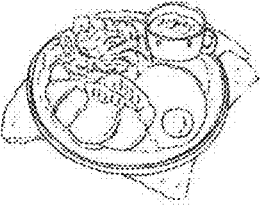
FIG. 1C Text Image Generative Erase Translated Text Image Output text Image Input Image Extracted Text Image Translated Text Image Translated output image

700

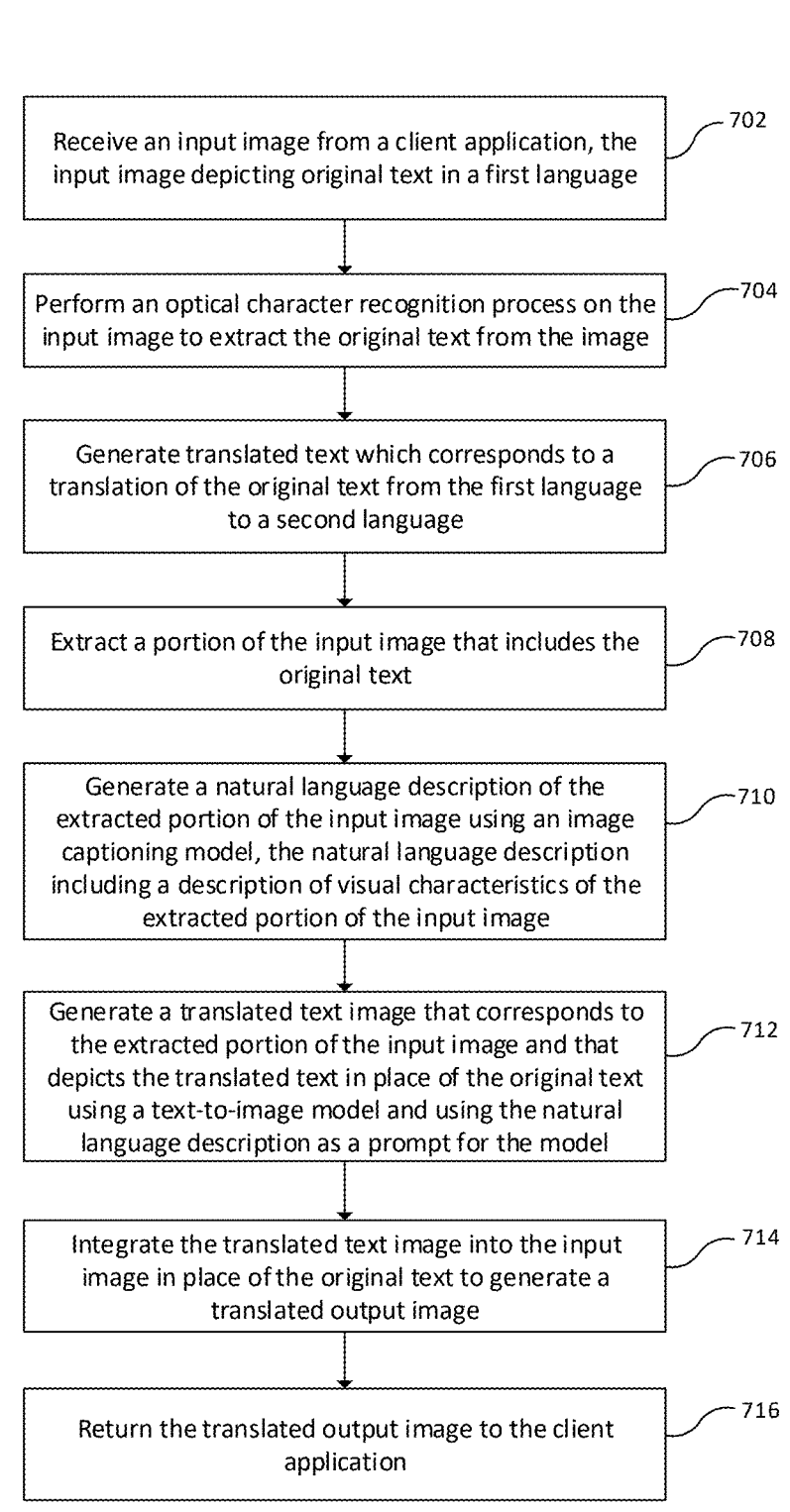

702 — Receive an input image from a client application, the input image depicting original text in a first language 704 — Perform an optical character recognition process on the input image to extract the original text from the image 706 — Generate translated text which corresponds to a translation of the original text from the first language to a second language 708 — Extract a portion of the input image that includes the original text 710 — Generate a natural language description of the extracted portion of the input image using an image captioning model, the natural language description including a description of visual characteristics of the extracted portion of the input image 712 — Generate a translated text image that corresponds to the extracted portion of the input image and that depicts the translated text in place of the original text using a text-to-image model and using the natural language description as a prompt for the model 714 — Integrate the translated text image into the input image in place of the original text to generate a translated output image 716 — Return the translated output image to the client application

FIG. 7

IN-CONTEXT IMAGE TRANSLATION SYSTEM

BACKGROUND

Previously known systems and methods for translating text found in images from one language to another utilize optical character recognition (OCR) techniques to convert text to a machine-readable format. The text is then submitted to a translation service which translates the text and presents the translated text to a user via a user interface. However, presenting the translated text to a user out of the context of the original image can be confusing to the user as it may not be readily apparent what the text is referring to in the image. In addition, previously known image translation methods typically require frequent switching from one application to another to translate the text which can diminish a user's productivity and attention span and result in a poor user experience which can make a user reluctant to perform such tasks.

What is needed is a method of automatically translating text found in an image and integrating the translated text into the image in place of the original text without requiring user intervention and/or without adversely impacting the appearance of the image.

SUMMARY

In one general aspect, the instant disclosure presents an in-context image translation system having a processor and a memory in communication with the processor wherein the memory stores executable instructions that, when executed by the processor alone or in combination with other processors, cause the in-context image translation system to perform multiple functions. The function may include receiving an input image from a client application, the input image depicting original text in a first language; performing an optical character recognition process on the input image to extract the original text from the image; generating translated text which corresponds to a translation of the original text from the first language to a second language; extracting a portion of the input image that includes the original text; generating a natural language description of the extracted portion of the input image using an image captioning model, the natural language description including a description of visual characteristics of the extracted portion of the input image; generating a translated text image that corresponds to the extracted portion of the input image and that depicts the translated text in place of the original text using a text-to-image model, the text-to-image model being trained to receive the natural language description of the extracted portion of the input image as a prompt and to generate the translated text image based on the prompt so that the translated text image has the visual characteristics of the extracted portion of the input image; integrating the translated text image into the input image in place of the original text to generate a translated output image; and returning the translated output image to the client application.

In yet another general aspect, the instant disclosure presents a method of generating an in-context image translation of an input image. The method includes performing an optical character recognition process on the input image to extract original text from the image; generating translated text which corresponds to a translation of the original text from a first language to a second language; extracting a portion of the input image that includes the original text; generating a natural language description of the extracted portion of the input image using an image captioning model, the natural language description including a description of visual characteristics of the extracted portion of the input image; generating a translated text image that corresponds to the extracted portion of the input image and that depicts the translated text in place of the original text using a text-to-image model, the text-to-image model being trained to receive the natural language description of the extracted portion of the input image as a prompt and to generate the translated text image based on the prompt so that the translated text image has the visual characteristics of the extracted portion of the input image; integrating the translated text image into the input image in place of the original text to generate a translated output image; and returning the translated output image to a client application associated with the input image.

In a further general aspect, the instant application describes a non-transitory computer readable medium on which are stored instructions that when executed cause a programmable device to perform functions of performing an optical character recognition process on an input image to extract original text from the image; generating translated text which corresponds to a translation of the original text from a first language to a second language; extracting a portion of the input image that includes the original text; generating a natural language description of the extracted portion of the input image using an image captioning model, the natural language description including a description of visual characteristics of the extracted portion of the input image; generating a translated text image that corresponds to the extracted portion of the input image and that depicts the translated text in place of the original text using a text-to-image model, the text-to-image model being trained to receive the natural language description of the extracted portion of the input image as a prompt and to generate the translated text image based on the prompt so that the translated text image has the visual characteristics of the extracted portion of the input image; integrating the translated text image into the input image in place of the original text to generate a translated output image; and returning the translated output image to a client application associated with the input image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1A shows an example of an image including objects and associated text to be translated.

FIG. 1B shows the result of translating the text in the image of FIG. 1B according to prior art translation methods that results in the translated text being displayed out of the context of the original image.

FIG. 1C shows how integrating translated text into the context of the original image can be beneficial to a user's understanding of the translated text.

FIG. 7 shows a flowchart of an example method of translating images using the image translation system of FIG. 3.

DETAILED DESCRIPTION

Figure 2:
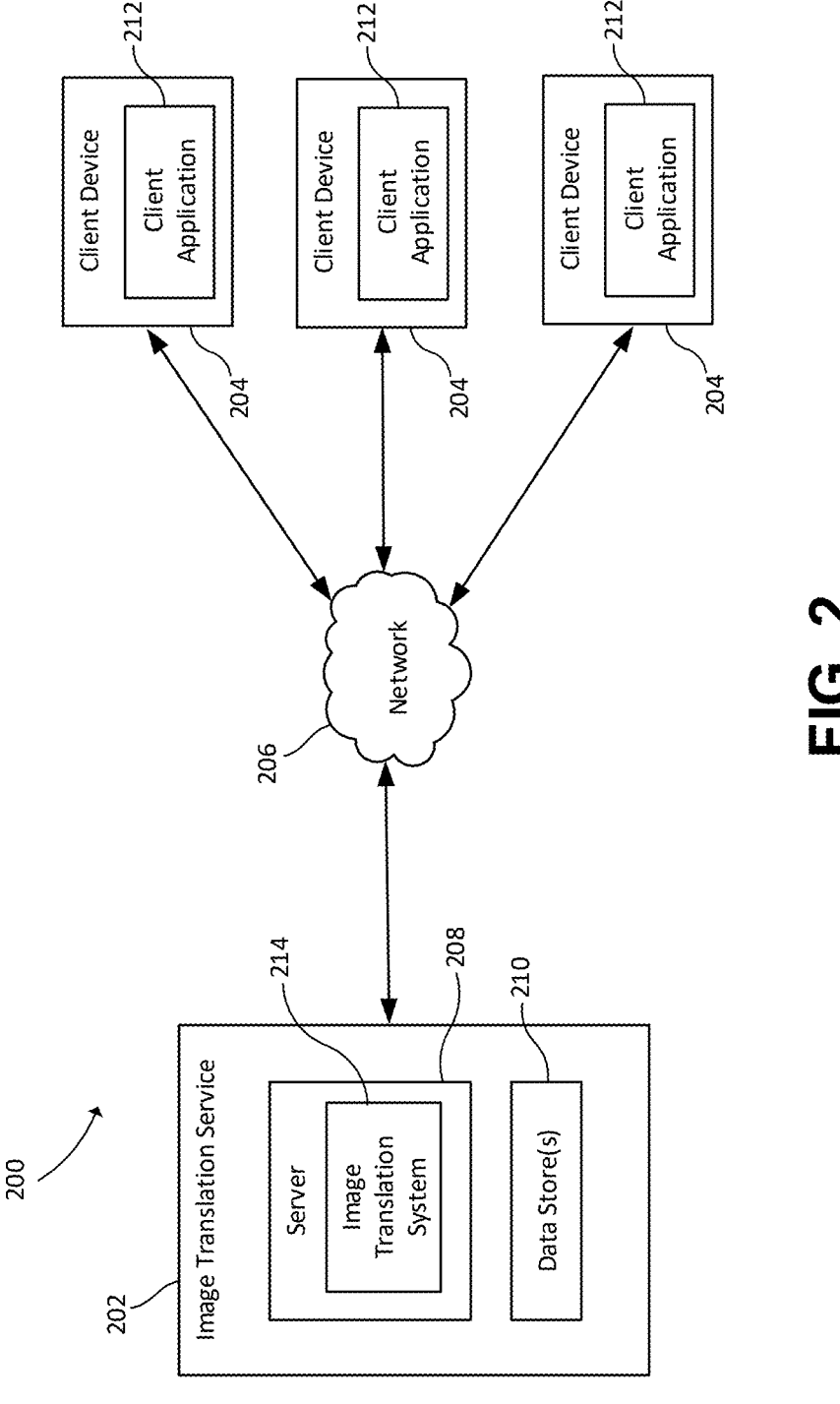
FIG. 2 is a diagram showing an example computing environment in which aspects of the disclosure may be implemented.

Systems and methods for translating text found in images from one language to another are known. These previously known systems and methods typically require that images be scanned using optical character recognition (OCR) software to convert text to a machine-readable format. An application can then submit the scanned text to a language translation service which translates the text from a source language to a target language. The translated text is then returned to the application where it can be displayed for a user. While this is an effective means of translating text in images, the translation process results in the text being processed and presented to a user out of the context of the original image in which it was found. However, the image from which the original text was extracted frequently provides contextual information and clues which can help users understand the meaning and purpose of the text in the original image. In some cases, presenting translated text outside of the original image (i.e., the original context) can make it more difficult for users to understand the translated text. This problem can be exacerbated when images include multiple distinct textual items of information blocks.

For example, an image of a menu can include multiple menu items, an example of which is shown in FIG. 1A. Each menu item includes a description of the menu item and an image which depicts the menu item. Typically, when such an image is translated according to previously known methods, the translated text of all items is presented to a user separately from the image, as shown in FIG. 1B. However, simply presenting a translation of all text depicted in an image as in FIG. 1B out of the context of the image may be confusing to a user as it can be difficult to determine which portion of the translated text is associated with which object (e.g., menu item in this case) in the original image. FIGS. 1A and 1B show just one example of a situation where previously known methods of translating text in images can be confusing to users. Substantially any image having multiple objects with textual information can pose similar problems for users. Previously known image translation methods are generally not capable of integrating translated text into the context of the original image, such as shown in FIG. 1C.

Another difficulty associated with translating text in images is the amount of context switching that is typically required to perform the translation. Context-switching refers to the act of switching between multiple contexts (e.g., applications, inputs, screen locations, and the like) to perform related and unrelated activities pertaining to a single task. Frequent context-switching is known to have a number of adverse effects, such as reduced productivity, decreased cognitive function, and diminished attention. Tasks, such as image translation, which require frequent context-switching can also result in a poor user experience which can, in turn, cause reluctance on the part of the user to perform such tasks.

To address these technical problems and more, in an example, this description provides technical solutions in the form of an in-context image translation system and method that uses machine learning and artificial intelligence (AI) techniques to recognize and translate text in an image from a source language to a target language and to replace the image(s) of the original text with image(s) of translated text that have the same visual characteristics as the original text so that the translated text is integrated seamlessly into the image without adversely impacting the visual appearance of the image. In some implementations, generative erasure techniques are used to erase the original text from the image. A text-to-image model is used to generate an image of the translated text that matches the image of the original text in the image and that is integrated into the image in place of the original text. Generative AI is used to generate a natural language description of the original text which is used as a prompt to guide the text-to-image model in generating the image of the translated text so that the translated text is integrated harmoniously into the image, thereby enhancing the overall aesthetics of the translated image while providing accurate and contextually relevant translations. The system's ability to adapt and generate visually consistent translations sets it apart from previously known image translation systems and methods, making it a versatile tool for diverse applications, from creative content creation to enhancing multilingual communication in visual media.

FIG. 2 shows an example computing environment 200 in which aspects of the disclosure may be implemented. The computing environment 200 includes an image translation service 202 and client devices 204 which communicate with each other via a network 206. The network 206 includes one or more wired, wireless, and/or a combination of wired and wireless networks. In some implementations, the network 206 includes one or more local area networks (LAN), wide area networks (WAN) (e.g., the Internet), public networks, private networks, virtual networks, mesh networks, peer-to-peer networks, and/or other interconnected data paths across which multiple devices may communicate. In some examples, the network 206 is coupled to or includes portions of a telecommunications network for sending data in a variety of different communication protocols. In some implementations, the network 206 includes Bluetooth® communication networks or a cellular communications network for sending and receiving data including via short messaging service (SMS), multimedia messaging service (MMS), hypertext transfer protocol (HTTP), direct data connection, WAP, email, and the like.

The image translation service 202 is implemented as a cloud-based service or set of services. To this end, the image translation service 202 is executed on or includes at least one server 208 which is configured to provide computational and/or storage resources for implementing the image translation service 202. The server 208 is representative of any physical or virtual computing system, device, or collection thereof, such as, a web server, rack server, blade server, virtual machine server, or tower server, as well as any other type of computing system used to implement the image translation service 202. Servers are implemented using any suitable number and type of physical and/or virtual computing resources (e.g., standalone computing devices, blade servers, virtual machines, etc.). Image translation service 202 may also include one or more data stores 210 for storing data, programs, and the like for implementing and managing the image translation service 202. In FIG. 2, one server 208 and one data store 210 are shown, although any suitable number of servers and/or data stores may be utilized. The image translation service 202 complies with privacy guidelines and regulations that apply to the usage of the user data included in the user database 128 to ensure that users have control over how the image translation service 202 utilizes their data.

Client devices 204 enable users to access the services provided by the image translation service 202 via the network 206. Client devices 204 can be any suitable type of computing device, such as personal computers, desktop computers, laptop computers, smart phones, tablets, gaming consoles, smart televisions and the like. Client devices 204 include at least one client application 212 that is configured to interact with the image translation service 202. In various implementations, client application 212 is a dedicated application installed on the client device and programmed to interact with one or more services provided by a cloud infrastructure. In some implementations, client application 212 is an add-on, extension, or the like that can be integrated into other applications to enable interaction with the image translation service 202. In some cases, client application 212 is a general-purpose application, such as a web browser, configured to access services and/or applications over the network 206.

Client application 212 is configured to send images having text to be translated to the image translation service 202. Images to be translated can be stand-alone images or images embedded in documents, such as web pages, word processing files, emails, messages, and the like. As such, a client application can comprise or be integrated into any of a variety of applications, such as image viewing/editing applications, web browsers, email applications, messaging applications, and the like. In various implementations, the client application is programmed to automatically detect images that include text to be translated, e.g., images displaying text that is in a source language that is different than the native language of the computing device on which the client application is being executed and to send these detected images to the image translation service 202 to be translated. As an alternative or in addition to automated image detection, the client application 212 can be programmed to enable users to select images to be sent to the image translation service 202 to be translated.

Image translation service 202 is programmed to process input images to detect the text to be translated, translate the original text from the source language to a target language, to generate an output image that corresponds to the input image with the original text replaced with the translated text, and to return the output image to the client application. The image translation service 202 can be programmed to translate substantially any source language(s) into substantially and target language(s). When the client application receives an output image from the image translation service, the client application is configured to cause the output image to be displayed in a user interface in place of the original image.

Figure 3:
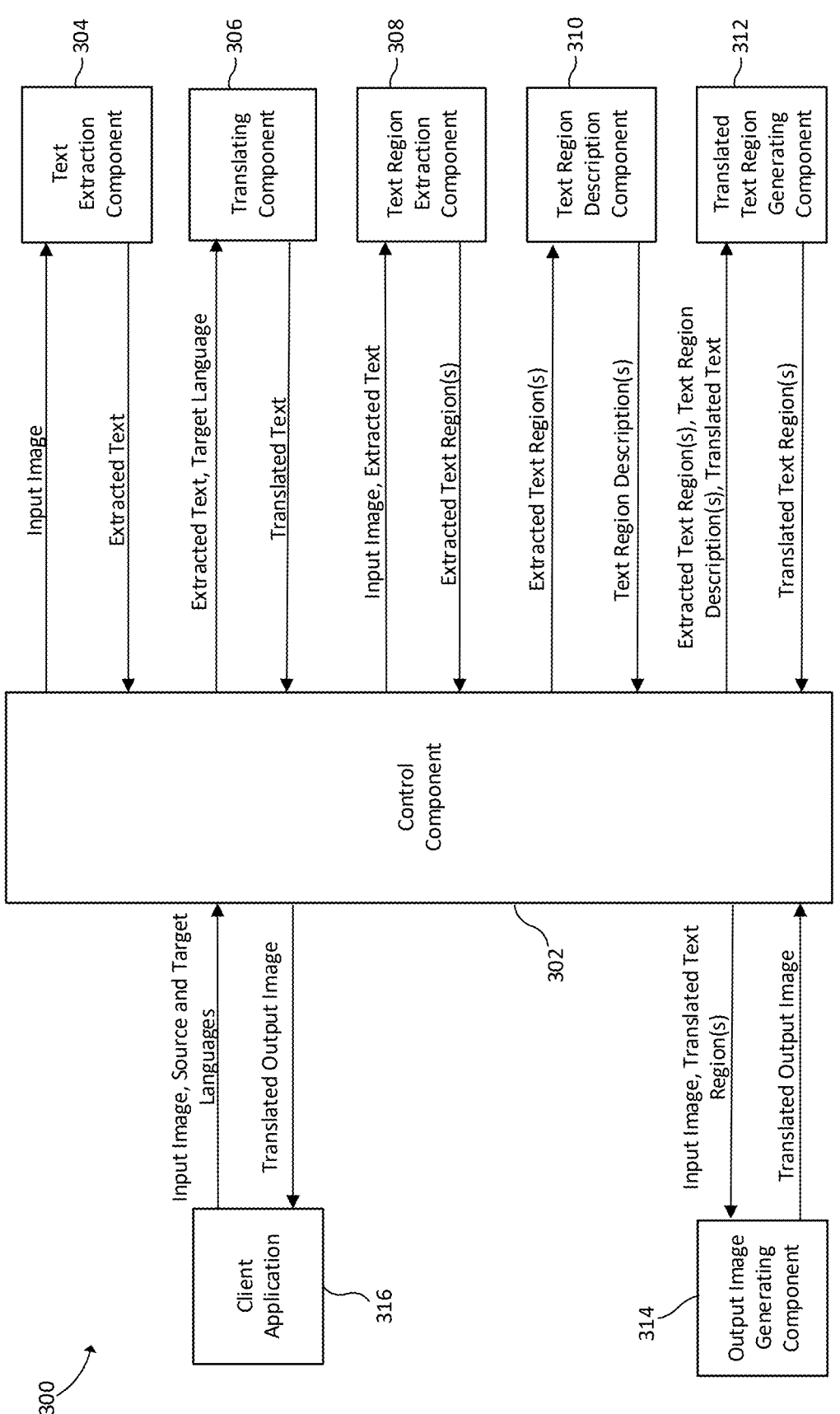
FIG. 3 shows an example implementation of an image translation system of the image translation service of FIG. 2.

Image translation service 202 includes an image translation system 214 for translating input images from a source language to a target language. An example implementation of an image translation system 300 is shown in FIG. 3. Image translation system 300 includes a control component 302, a text extraction component 304, a text translating component 306, a text region extraction component 308, a text region description component 310, a translated text region generating component 312, and an output image generating component 314. During use, the control component 302 receives an input image (i.e., image to be translated) from a client application 316 and coordinates the processing of the input image by the various components of the system 300 to generate a translated output image which is returned to the client application 316.

First, the control component 302 provides the input image to the text extraction component 304. The text extraction component performs a text extraction process, such as an OCR process, on the input image to detect and recognize text in the image and convert the text into a machine-readable format. Any suitable OCR technique or strategy can be utilized to extract text from the input image. The text extraction component 304 is configured to recognize text in at least one source language. In some implementations, the text extraction component 304 is capable of detecting a source language of the text in the input image. In other implementations, the source language is provided as an input to the text extraction component 304. For example, in some cases, the source language is provided as an input from the client application 316 along with the input image.

The extracted text is then provided to the text translating component 306. In various implementations, the translating component 306 includes a machine translation (MT) model which receives the extracted text, the source language, and the target language as inputs, translates the image text from the source language to the target language, and provides the translated text as an output. The MT model can be configured to translate the source text using any suitable machine translation technique, such as Rules-Based Machine Translation (RBMT), Statistical Machine Translation (SMT), Neural Machine Translation (NMT), and the like, to translate the source text. The extracted text and the input image are then provided to the text region extraction component 308. The text region extraction component 308 is configured to process the input image to extract text regions from the input image that have the extracted text. As used herein, the term "text region" is used to refer to a region, or area, of an image that includes the extracted text. In various implementations, the text region extraction component 308 is configured to utilize an image segmentation technique to extract image segments from the input image that have the extracted text. For example, the text region extraction component 308 can comprise an image segmentation model that is trained to "cut out" portions of images based on instructions provided to the model via text prompts. In this example, the text extracted from the input image can be included in a prompt to an image segmentation model which instructs the model to extract portions of the image that include the text.

Each extracted text region is provided to a text region description component 310 as an input. The text region description component 310 is configured to generate a description of each text region. In various implementations, the text region description component 310 includes an image captioning model trained to describe the content of an image in words. The image captioning model can be trained to include various characteristics of the input text region in the description, including characteristics such as color, style, texture, etc. of objects in the text region. In some implementations, extracted text regions include only the text so the text region description only describes the description of the text (e.g., font, size, color, texture, etc.) in the image. In other implementations, extracted text regions include the background in addition to the text so that the text region description includes a description of the font as well as a description of the background of the text region (e.g., color(s), texture, fill, border, etc.).

In some implementations, the image captioning process is performed using an encoder-decoder framework, where an input image is encoded into an intermediate representation of the information in the image, and then decoded into a descriptive text sequence which is a natural language description of the input image. Any suitable machine learning model, algorithm, and/or technique can be used to generate the descriptions for the input images. The text region description component 310 outputs a natural language description of each text region to the control component 302.

The text region description and the translated text for an extracted text region is then provided to a translated text region generating component 312. The translated text region generating component 312 is configured to generate a translated text region (i.e., image) with translated text that visually matches the original text in the extracted text region. In implementations in which the extracted text image includes the background, the translated text region includes a background that visually matches the background of the extracted text region.

Figure 4:
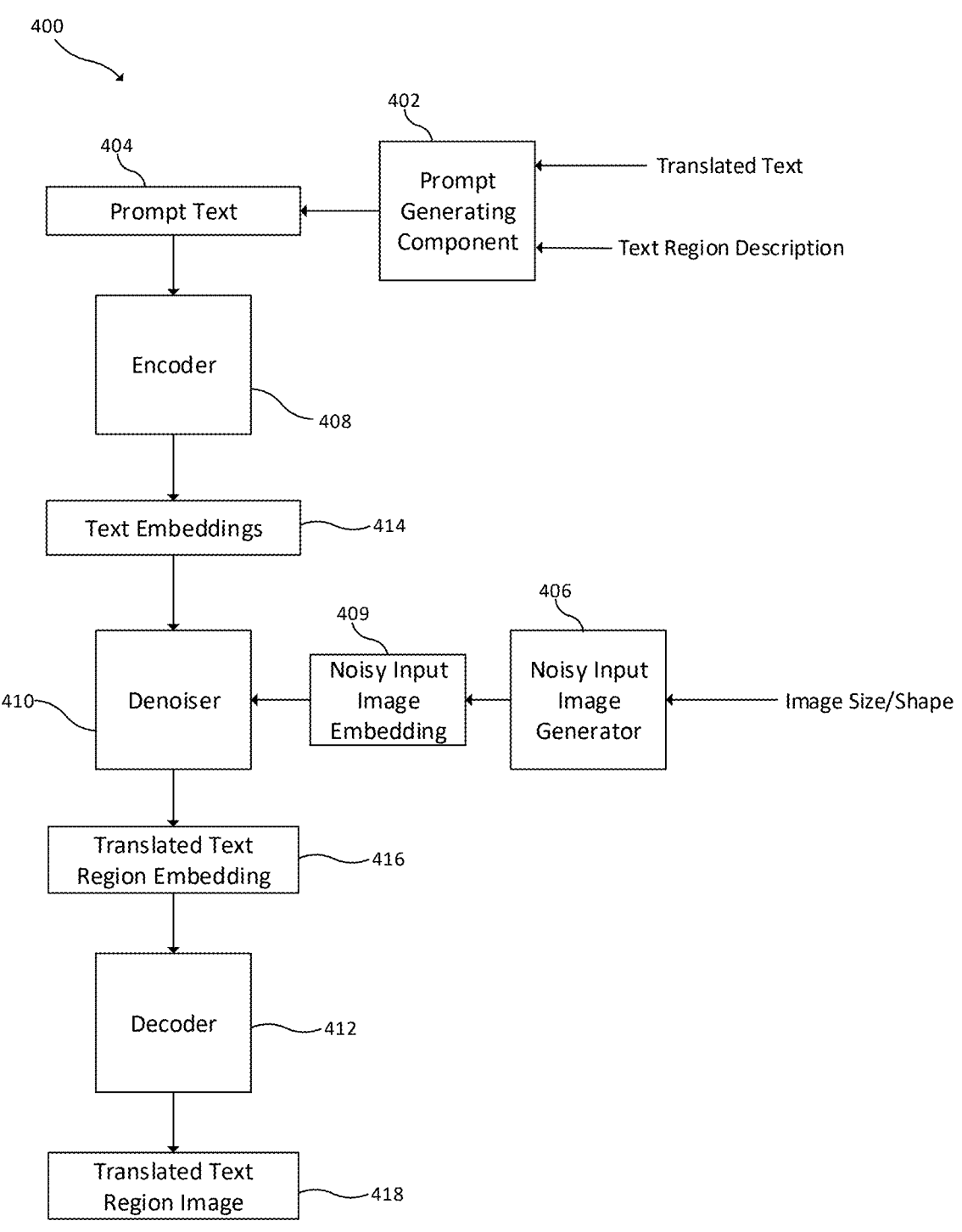
FIG. 4 shows an example implementation of a translated text image generating model of the image translation system of FIG. 3.

The translated text region generating component 312 includes a translated text region generating model for generating translated regions. An example implementation of a translated text region generating model 400 is shown in FIG. 4. The translated text region generating model 400 is a text-to-image model, a text-guided image-to-image model, or the like trained to generate images based on natural language text descriptions. As shown in FIG. 4, the translated text region generating model 400 includes a prompt generating component 402 which is configured to generate a prompt 404 including the text region description and the translated text in a format that is understandable by the model 400.

In the implementation of FIG. 4, the translated text region generating model 400 comprises a diffusion model, such as a Stable Diffusion model, which is trained to iteratively denoise a noisy input image conditioned on the prompt text. To this end, the translated text region generating model includes a noisy image generator 406 which is configured to generate a noisy input image 409 (e.g., Gaussian noise). In various implementations, the noisy input images are generated with the same size and shape as the extracted text region for which they are being generated. The noisy input image generator encodes the noisy input image to generate a noisy input image embedding 409 which maps the noisy input image to the same continuous embedding space as the encoded prompt. The noisy input image embedding 409 can be generated by the noisy image generator 406 in any suitable manner.

The translated text region generating model includes an encoder 408, a denoiser 410, and a decoder 412. The encoder 408 is a machine learning model, such as a generative transformer model, trained to tokenize the prompt text 404 and transform the tokenized prompt into text embeddings 414, also referred to as continuous representations, vector representations, or the like, which map the prompt text to a continuous embedding space. Any suitable type of encoder can be used.

The denoiser 410 receives the prompt text embeddings 414 and the noisy input image embedding 408 as inputs and is trained to iteratively denoise the noisy input image embedding 408 conditioned on the prompt text embeddings 414 to generate a translated text region embedding 416. The denoiser 410 is trained to iteratively predict the noise which has been added to an input image that, when subtracted, will result in an output image that satisfies the conditions set by the prompt text. The denoiser 410 then generates a denoised image embedding which will be used as the input image for the next iteration. A predetermined number of iterations is performed to generate a translated texts region embedding 416.

The decoder 412 decodes the translated text region embedding 416 to generate translated text region image 418. The final translated text region has the same visual characteristics as the extracted text region used as input and includes the translated text from the extracted text region depicted in the same visual style as the original text. In some implementations, the decoder is implemented by a Variational Auto Encoder (VAE) although any suitable type of image decoder may be utilized. The components of the translated text region generating model can be implemented using any suitable type and/or combination of components from image generating models, such as DALL-E, CLIP, Vision Transformer (ViT), Megatron-Turing NLG, Imagen, GauGAN2, VQGAN+CLIP, SDXL Turbo, Stable Diffusion XL, Stable Diffusion Waifu Diffusion, Realistic Vision, MeinaMix, Anything V3, DreamShaper, Protogen, Elldreths Retro Mix, Modelshoot, or the like.

Figure 5A:
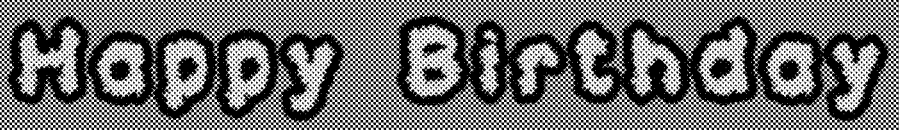
FIGS. 5A-5D show an example of extracted text images and translated text images after various stages of the image translation process according to this disclosure.
Figure 5B:
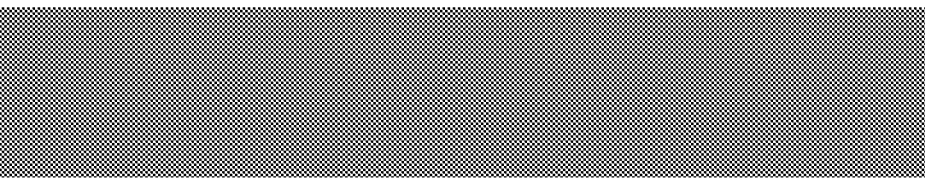
Figure 5C:
Figure 5D:
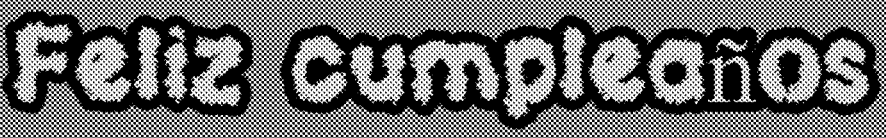

Returning to FIG. 3, the final translated text region is provided along with the input image to the output image generating component 314. The output image generating component 314 is configured to replace original text images in the input image with corresponding translated text images. In some implementations, replacing original text images with translated text images involves performing a generative erase process as is known in the art to erase original text images from their positions in the original image and adding the corresponding translated text images in these positions. FIGS. 5A-5D show the original and translated text images for on an example input image at various stages of the process. For example, FIG. 5A shows a text image including the words "Happy Birthday" printed with a cloud font style on a red background. In this example, a generative erase process is used to remove the text images, as shown in FIG. 5B. FIG. 5C shows a translated text image including the words "Feliz cumpleaños" which has been generated to replace the original text. The translated text is added in place of the original text to generate an output text image, as shown in FIG. 5D.

Figure 6A:
FIGS. 6A-6D show another example of extracted text images and translated text images after various stages of the image translation process according to this disclosure.
Figure 6B:
Figure 6C:
Figure 6D:

FIGS. 6A-6D show the input image and translated text images generated when the extracted text images include the image background. As shown in FIG. 6A, an input image includes the words "Happy Birthday" printed on a blue background. A white border area surrounds the blue region. The background of the image is filled with cross-hatching. The extracted text image shown in FIG. 6B includes the blue region in which the original text is shown and the white border area. In this example, the text description for the extracted text image will include a description of the font and a description of the background (e.g., blue with a white border). As a result, the translated text image will include the translated text printed on a blue background with a white border, as shown in FIG. 6C. The output handling component 314 in this case can either erase the extracted original image (FIG. 6B) from the output image and replace it with the translated text image (FIG. 6C) or simply cover the original text image (FIG. 6B) with the translated text image (FIG. 6C) to generate the translated output image. The translated output image is then returned to the client application where it is used to replace the original image in the user interface of the client application.

FIG. 7 shows an example flowchart of a method 700 of performing in-context image translation using the image translation system described above. The method 700 begins with receiving an input image from a client application (block 702). An optical character recognition process is then performed on the input image to extract original text from the image (block 704). Translated text is then generated which corresponds to a translation of the original text from a first language to a second language (block 706). In addition, a portion of the input that includes the original text is extracted (block 708). A natural language description of the extracted portion of the input image is then generating using an image captioning model, the natural language description including a description of visual characteristics of the extracted portion of the input image (block 710). A text-to-image model is then used to generate a translated text image that corresponds to the extracted portion of the input image and that depicts the translated text in place of the original text using the natural language description as a prompt for the model (block 712). The translated text image is integrated into the input image in place of the original text to generate a translated output image (block 714). The translated output image is then returned to the client application (block 716).

Figure 8:
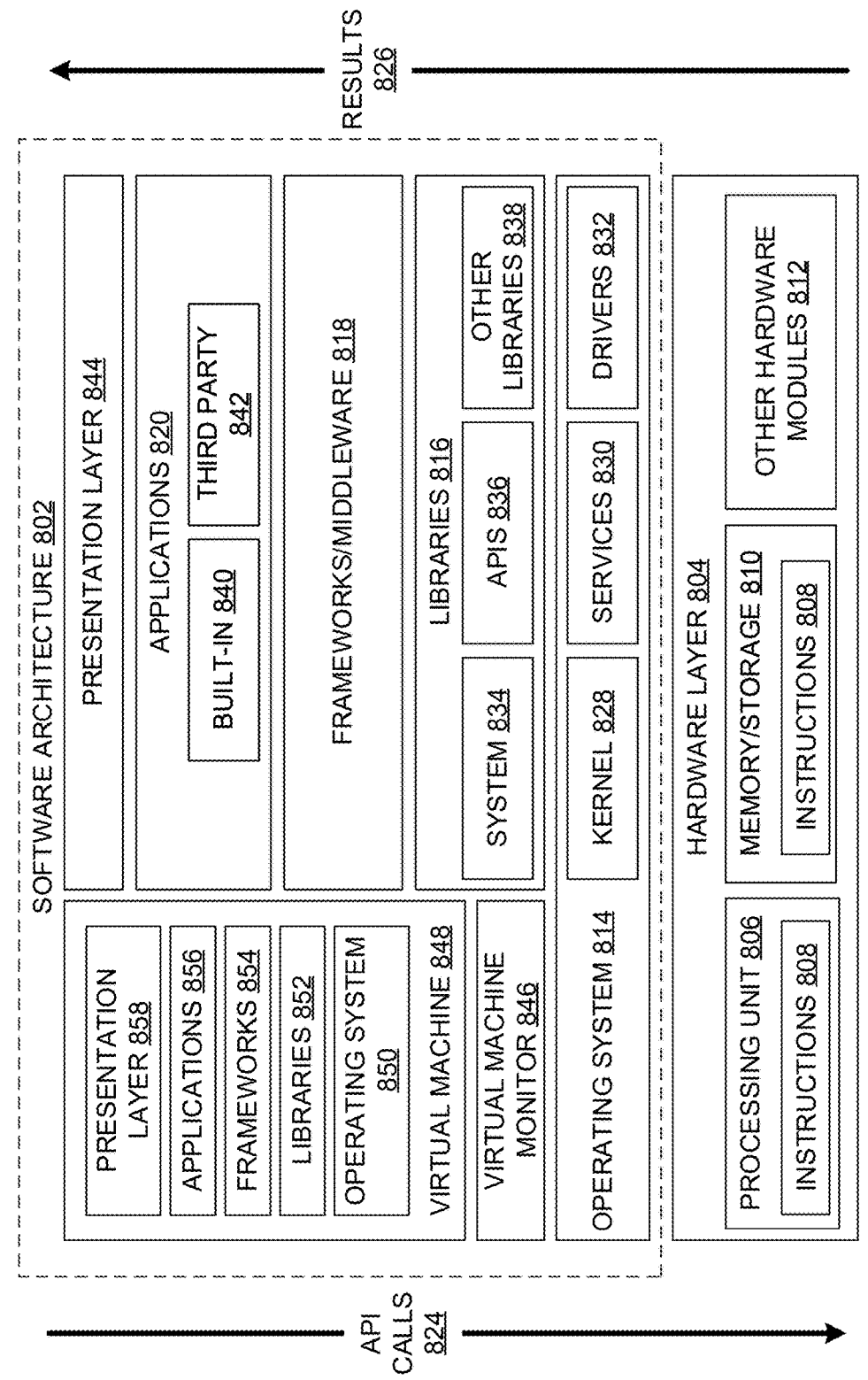
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
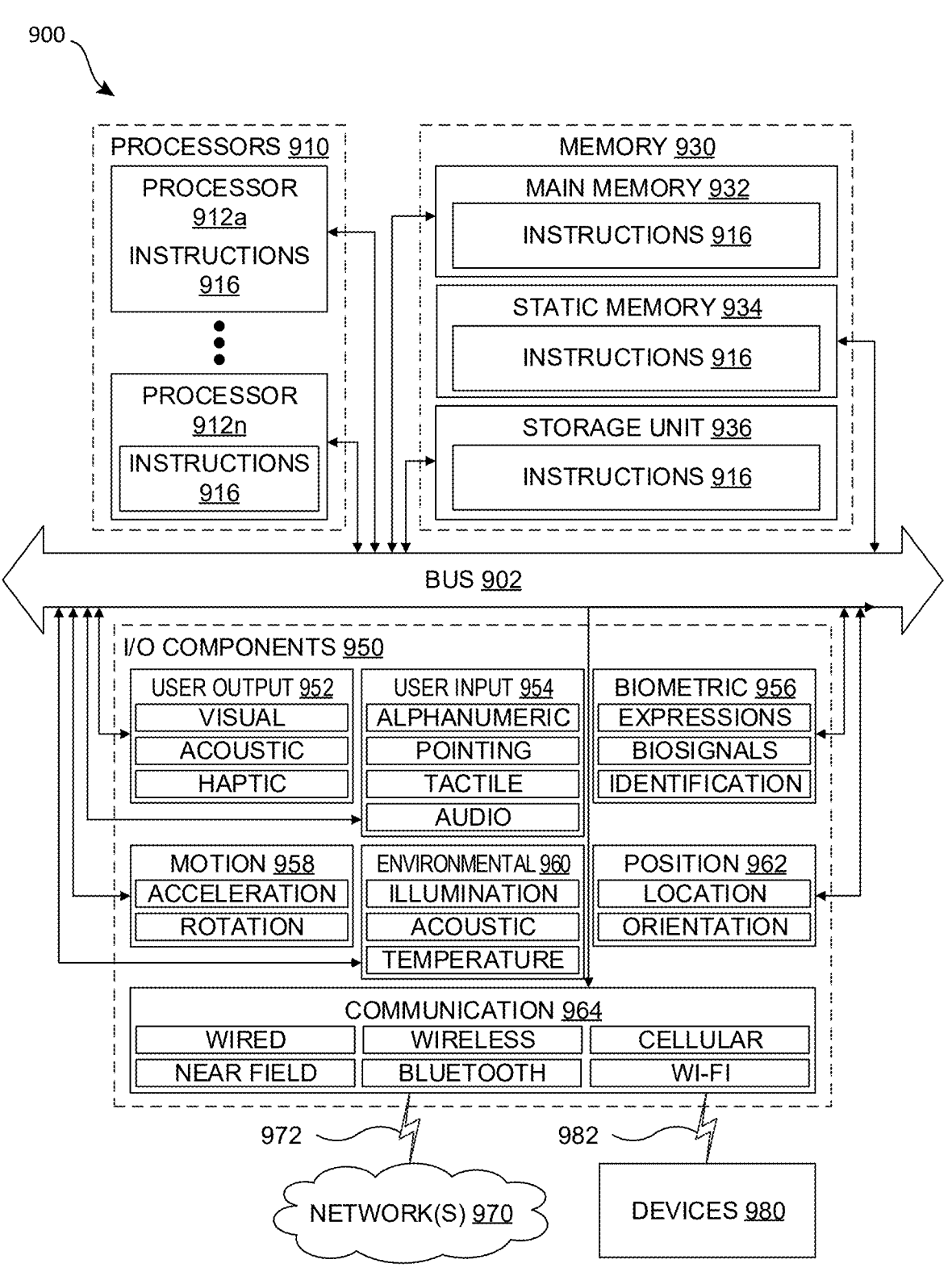
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

What is claimed is:

1. An in-context image translation system comprising:

a processor; and a memory in communication with the processor, the memory comprising executable instructions that, when executed by the processor alone or in combination with other processors, cause the in-context image translation system to perform functions of:

receiving an input image from a client application, the input image depicting original text in a first language;

performing an optical character recognition process on the input image to extract the original text from the image;

generating translated text which corresponds to a translation of the original text from the first language to a second language;

extracting a portion of the input image that includes the original text;

generating a natural language description of the extracted portion of the input image using an image captioning model, the natural language description including a description of visual characteristics of the extracted portion of the input image;

generating a translated text image that corresponds to the extracted portion of the input image and that depicts the translated text in place of the original text using a text-to-image model, the text-to-image model being trained to receive the natural language description of the extracted portion of the input image as a prompt and to generate the translated text image based on the prompt so that the translated text image has the visual characteristics of the extracted portion of the input image;

integrating the translated text image into the input image in place of the original text to generate a translated output image; and returning the translated output image to the client application.

2. The in-context image translation system of claim 1, wherein the extracted portion of the input image includes only the original text.

3. The in-context image translation system of claim 2, wherein the natural language description includes a description of visual characteristics of the original text, the visual characteristics including one or more of a color, a texture, a font, and a size of the original text.

4. The in-context image translation system of claim 2, further comprising:

performing a generative erase process to erase the original text from the input image before integrating the translated text image into the input image.

5. The in-context image translation system of claim 1, wherein the extracted portion of the input image includes the original text and a background of the original text.

6. The in-context image translation system of claim 5, wherein:

the natural language description includes a description of visual characteristics of the original text and the background of the extracted portion of the input image, the visual characteristics of the original text include one or more of a color, a texture, a font, and a size of the original text, and the visual characteristics of the background of the extracted portion of the input image include one or more of a color, a texture, a size, and a shape of the background of the extracted portion.

7. The in-context image translation system of claim 6, wherein:

generating the translated text image includes generating a translated text portion of the translated text image with the visual characteristics of the original text and generating a background portion of the translated text image with the visual characteristics of the background of the extracted portion of the input image.

8. The in-context image translation system of claim 1, further comprising:

generating the prompt for the text-to-image model using a prompt generating component, the prompt including the natural language description of the extracted portion of the input image and the translated text.

9. The in-context image translation system of claim 1, wherein the text-to-image model comprises a Stable Diffusion model.

10. A method of generating an in-context image translation of an input image, the method comprising:

performing an optical character recognition process on the input image to extract original text from the input image;

generating translated text which corresponds to a translation of the original text from a first language to a second language;

extracting a portion of the input image that includes the original text;

generating a natural language description of the extracted portion of the input image using an image captioning model, the natural language description including a description of visual characteristics of the extracted portion of the input image;

generating a translated text image that corresponds to the extracted portion of the input image and that depicts the translated text in place of the original text using a text-to-image model, the text-to-image model being trained to receive the natural language description of the extracted portion of the input image as a prompt and to generate the translated text image based on the prompt so that the translated text image has the visual characteristics of the extracted portion of the input image;

integrating the translated text image into the input image in place of the original text to generate a translated output image; and returning the translated output image to a client application associated with the input image.

11. The method of claim 10, wherein the extracted portion of the input image includes only the original text.

12. The method of claim 11, wherein the natural language description includes a description of visual characteristics of the original text, the visual characteristics including one or more of a color, a texture, a font, and a size of the original text.

13. The method of claim 11, further comprising:

performing a generative erase process to erase the original text from the input image before integrating the translated text image into the input image.

14. The method of claim 10, wherein the extracted portion of the input image includes the original text and a background of the original text.

15. The method of claim 14, wherein:

the natural language description includes a description of visual characteristics of the original text and the background of the extracted portion of the input image, the visual characteristics of the original text include one or more of a color, a texture, a font, and a size of the original text, and the visual characteristics of the background of the extracted portion of the input image include one or more of a color, a texture, a size, and a shape of the background of the extracted portion.

16. The method of claim 15, wherein:

generating the translated text image includes generating a translated text portion of the translated text image with the visual characteristics of the original text and generating a background portion of the translated text image with the visual characteristics of the background of the extracted portion of the input image.

17. The method of claim 10, further comprising:

generating the prompt for the text-to-image model using a prompt generating component, the prompt including the natural language description of the extracted portion of the input image and the translated text.

18. The method of claim 10, wherein the text-to-image model comprises a Stable Diffusion model.

19. A non-transitory computer readable medium on which are stored instructions that, when executed, cause a programmable device to perform functions of:

performing an optical character recognition process on an input image to extract original text from the image;

generating translated text which corresponds to a translation of the original text from a first language to a second language;

extracting a portion of the input image that includes the original text;

generating a natural language description of the extracted portion of the input image using an image captioning model, the natural language description including a description of visual characteristics of the extracted portion of the input image;

generating a translated text image that corresponds to the extracted portion of the input image and that depicts the translated text in place of the original text using a text-to-image model, the text-to-image model being trained to receive the natural language description of the extracted portion of the input image as a prompt and to generate the translated text image based on the prompt so that the translated text image has the visual characteristics of the extracted portion of the input image;

integrating the translated text image into the input image in place of the original text to generate a translated output image; and returning the translated output image to a client application associated with the input image.

20. The non-transitory computer readable medium of claim 19, further comprising:

generating the prompt for the text-to-image model using a prompt generating component, the prompt including the natural language description of the extracted portion of the input image and the translated text.

\* \* \* \* \*